United States Patent [19]
Asakura

[11] Patent Number: 5,828,517
[45] Date of Patent: Oct. 27, 1998

[54] DOOR OPENING MECHANISM OF CASSETTE LOADING DEVICE

[75] Inventor: Naoki Asakura, Nagaokakyo, Japan

[73] Assignee: Mitsubishi Denki Kabushiki Kaisha, Tokyo, Japan

[21] Appl. No.: 691,261

[22] Filed: Aug. 2, 1996

Related U.S. Application Data

[60] Continuation of Ser. No. 462,618, Jun. 5, 1995, abandoned, which is a division of Ser. No. 283,154, Aug. 3, 1994, abandoned.

[30] Foreign Application Priority Data

Aug. 17, 1993  [JP]  Japan .................................. 5-203461

[51] Int. Cl.⁶ ................................................ G11B 5/008
[52] U.S. Cl. ........................................................ 360/96.5
[58] Field of Search ............................... 360/96.5, 96.6, 360/93

[56] References Cited

U.S. PATENT DOCUMENTS

| 2,823,561 | 2/1958 | Opocensky . | |
|---|---|---|---|
| 4,511,940 | 4/1985 | Yamaguchi et al. | 360/96.6 |
| 4,823,633 | 4/1989 | Pike | 74/411.5 |
| 4,835,636 | 5/1989 | Kanai et al. | 360/96.5 |
| 4,992,895 | 2/1991 | Kim | 360/96.5 |
| 4,996,612 | 2/1991 | Suda | 360/96.5 |
| 5,025,331 | 6/1991 | Hirayama et al. | 360/85 |
| 5,050,022 | 9/1991 | Aizawa | 360/96.5 |

FOREIGN PATENT DOCUMENTS

| 0376281 | 7/1990 | European Pat. Off. . | |
|---|---|---|---|
| 0400825 A2 | 12/1990 | European Pat. Off. . | |
| 0431966 | 6/1991 | European Pat. Off. | 360/96.5 |
| 3530730 | 3/1986 | Germany . | |
| 3832889 | 4/1989 | Germany . | |
| 4135834 | 5/1993 | Germany . | |
| 58-94160 | 6/1983 | Japan | 360/96.5 |
| 60-119661 | 6/1985 | Japan | 360/96.5 |
| 61-190749 | 8/1986 | Japan | 360/96.5 |
| 1116953 | 5/1989 | Japan | 360/96.5 |
| 1220170 | 9/1989 | Japan . | |
| 231362A | 2/1990 | Japan . | |
| 253252 | 2/1990 | Japan . | |
| 268756 | 3/1990 | Japan . | |
| 2201762 | 8/1990 | Japan | 360/96.5 |
| 3228248 | 10/1991 | Japan | 360/96.5 |
| 3248364 | 11/1991 | Japan | 360/96.5 |
| 4205754 | 7/1992 | Japan . | |
| 4364262 | 12/1992 | Japan | 360/96.5 |
| 6168526 | 6/1994 | Japan . | |
| 1201913 | 8/1970 | United Kingdom . | |
| 2210495 | 6/1989 | United Kingdom . | |

*Primary Examiner*—Stuart S. Levy
*Assistant Examiner*—William J. Klimowicz

[57] ABSTRACT

A cassette loading device includes a door opening/closing mechanism that includes a single element arm or the like for selectively opening and closing a cassette loading door, in accordance with the movement of a cassette receiving housing between a ejected position and a loaded position. The single element is selectively locked into place so as to not cause the cassette loading door to open, such as when a tape cassette is not inserted into the cassette receiving housing. Therefore, the cassette loading door remains closed until a tape cassette is moved into or out of the cassette receiving housing.

22 Claims, 22 Drawing Sheets

DOOR OPENING MECHANISM OF CASSETTE LOADING DEVICE

This application is a continuation of application Ser. No. 08/462,618 filed on Jun. 5, 1995, now abandoned; which was a divisional of application Ser. No. 08/283,154 filed on Aug. 3, 1994, now abandoned.

BACKGROUND OF THE INVENTION

1. Field of the Invention

The present invention relates to a cassette loading device of a magnetic recording/reproducing apparatus.

2. Description of Related Art

A cassette loading device in the prior art will be described below. FIG. 1 is a perspective view of a cassette loading device in the prior art; FIG. 2 is an exploded perspective view of the cassette loading device in the prior art; FIG. 3 is a perspective view of a movable part of a cassette housing in the prior art; FIG. 4 is a side view showing a major portion of a cassette housing drive in the prior art; FIG. 5 is a side view of a major portion of gears in FIG. 4; and FIGS. 6A and 6B are side views showing a major portion of a door moving mechanism. In particular, FIG. 6A shows a state where a door is open, and FIG. 6B shows a positional relationship between an arm and the door when the door is closed.

In FIG. 1, a reference number "1" indicates the whole of a cassette loading device, "2" indicates a video tape cassette (which will be referred to merely as a "cassette"), "3" indicates a door, "4" indicates a cassette housing which is moved when it houses the inserted cassette 2, "5" indicates a bottom plate of the cassette housing 4, and "6" indicates the drive force transmitting mechanism which is driven by a loading motor (not shown) for moving the cassette housing 4.

In FIGS. 2, 3, 4 and 5, 5a indicates bosses which are provided at the opposite ends of the bottom plate 5 and which are engaged with arms 10. A reference number "7" indicates a top plate, "8" indicates a shaft which is rotated together with an arm lock 9 and arms 10 fixed thereto. A reference number "11" indicates a right side plate, "12" indicates a left side plate, "13" indicates a top plate, "15" indicates a gear drive which is coaxially fixed to a worm gear 16 for driving the arm lock 9. A reference number "17" indicates a worm for driving the worm gear 16. A reference number "18" indicates a gear which is fixed coaxially to the worm 17 and which is driven by the unillustrated loading motor. A reference number "20" indicates guide grooves formed at the side plates 11 and 12 for guiding the bosses 5a.

In FIGS. 6A and 6B, "9a" indicates a cam fixed coaxially to the arm lock 9, "19a" and "19b" indicate arms, and "19c" indicates a spring. The arm 19b is provided at its end with an engagement boss 19d which is engaged with an engagement piece 3a of the door 3. The spring 19c forces, as shown in FIG. 6B, the door 3 in the closing direction. When a pushing force is applied to a front surface, the door 3 is pushed and turned upward around the engagement boss 19d. These parts form a door opening/closing mechanism, and the door 3 is opened and closed in accordance with engagement of the cam 9a with the arm 19a.

The operation will now be described below. The inserted cassette 2 is placed on the bottom plate 5, and the unillustrated loading motor is driven, thereby, the arm lock 9 is driven to rotate clockwise in FIG. 4, so that the bosses 5a move horizontally along the guide grooves 20, and then move vertically and downward to attain the loading state of the cassette 2.

When the cassette is to be ejected, the operation is performed oppositely to that mentioned above. Specifically, the loading motor rotates the arm lock 9 counterclockwise in accordance with an ejection instruction, so that the bosses 5a are raised vertically along the guide grooves 20, and then are moved horizontally for ejecting the cassette 2.

The drive force transmitting mechanism 6 for transmitting the drive force for loading and ejecting the cassette 2 is disposed at the outer side of the right side plate 11. As shown in FIG. 2, many parts are required, which complicates assembly steps and requires a long time for these steps.

The door moving mechanism will now be described below. In FIGS. 6A and 6B, prior to insertion of the cassette 2, the cam 9a is located at a position lower than the illustrated position, and thus is not engaged with the arm 19a. Therefore, the arm 19b is in the lowered position, and the door 3 is closed (see FIG. 6B). As described above, the engagement boss 19d at the end of the arm 19b is engaged with the engagement piece 3a of the door, and the arms 19a and 19b are forced by the spring 19c to close the door 3. When the cassette 2 is inserted, the door 3 is pushed upwardly, and the unillustrated loading motor is driven to rotate the gear drive 15 counterclockwise. Thus, the arm lock 9 rotates clockwise to raise and engage the cam 9a with the arm 19a as shown in FIG. 6A.

Owing to this engagement, the arm 19a rotates clockwise to raise the arm 19b, so that the door 3 is moved and maintained at the open position (see FIG. 6A). When the cassette 2 further moves to a position near the loading position, the cam 9a is further raised and thus is disengaged from the arm 19a, so that the door 3 is closed.

When the cassette is to be ejected, the operation is performed opposite to the above-mentioned operation. More specifically, the loading motor is driven in accordance with the cassette ejection instruction, so that the gear drive 15 rotates clockwise to rotate the arm 19a clockwise. Thereby the cam 9a is lowered from the upper position and engages with the arm 19a to open the door 3 as shown in FIG. 6A. Thereafter, the cassette 2 reaches the ejection position, and the cam 9a is disengaged from the arm 19a. Since the cassette 2 stops when it is partially protruded beyond the door 3, it keeps the door 3 open. After the cassette 2 is ejected completely, the spring 19c elastically closes the door 3.

The door moving mechanism described above requires the arms 19a and 19b as well as the spring 19c. It further requires assembly of these parts and connection between the arm 19b and the door 3. Thus, it requires many parts to be assembled. Therefore, it is difficult to achieve a high assembly accuracy, and a long time is required for the assembly.

SUMMARY OF THE INVENTION

The present invention has been developed in an effort to overcome the above-noted disadvantages. It is an object of the invention to provide a cassette loading device which is formed of a small number of parts and which can be easily assembled. Another object of the invention is to increase mechanical strength of a part of a cassette loading device. Still another object of the invention is to provide a cassette loading device which includes door opening/closing means consisting of a small number of parts and which improves an assembly accuracy.

A cassette loading device according to the invention includes a cassette housing for housing and moving a tape cassette to a predetermined position, and drive force transmitting means for transmitting the drive force supplied from a loading motor to the cassette housing. In such a device, the Further, a cassette loading device according to the invention includes a cassette housing for housing and moving a tape cassette to a predetermined position; drive force transmitting means for transmitting the drive force supplied from a loading motor to the cassette housing; moving means for moving said cassette housing by said drive force; and door opening/closing means, made of one part and having an engagement portion which engages with said moving means within a predetermined rotational range, for being operable to open and close a door provided at a loading inlet for said tape cassette in accordance with the moving range of said moving means, and said moving means fixing said door moving means in the door close state during the operation of ejecting the tape cassette.

Additionally, in the cassette loading device according to the invention described above, the door opening/closing means turns upward to push the door upward for opening the door, and turns downward away from the door for closing the door.

Additionally, in the cassette loading device according to the invention described above, the moving means pushes downward said door opening/closing means at a position of ejection of the tape cassette.

Accordingly, the door opening/closing means is fixed at the door close state during the operation of ejecting the tape cassette. Thus it is not necessary to provide a spring, which was required for fixing the door opening/closing means in the prior art, so that the door opening/closing means of the integral type can be employed. Therefore, the door opening/closing means can be formed of a reduced number of parts. Further, the door is not connected to the door opening/closing means, which also reduces the number of parts of the door opening/closing means, and thus facilitates the assembly.

The above and further objects and features of the invention will more fully be apparent from the following detailed description with accompanying drawings.

DESCRIPTION OF THE PREFERRED EMBODIMENTS

Embodiments of the invention will be described below with reference to the drawings.

Figure 1:
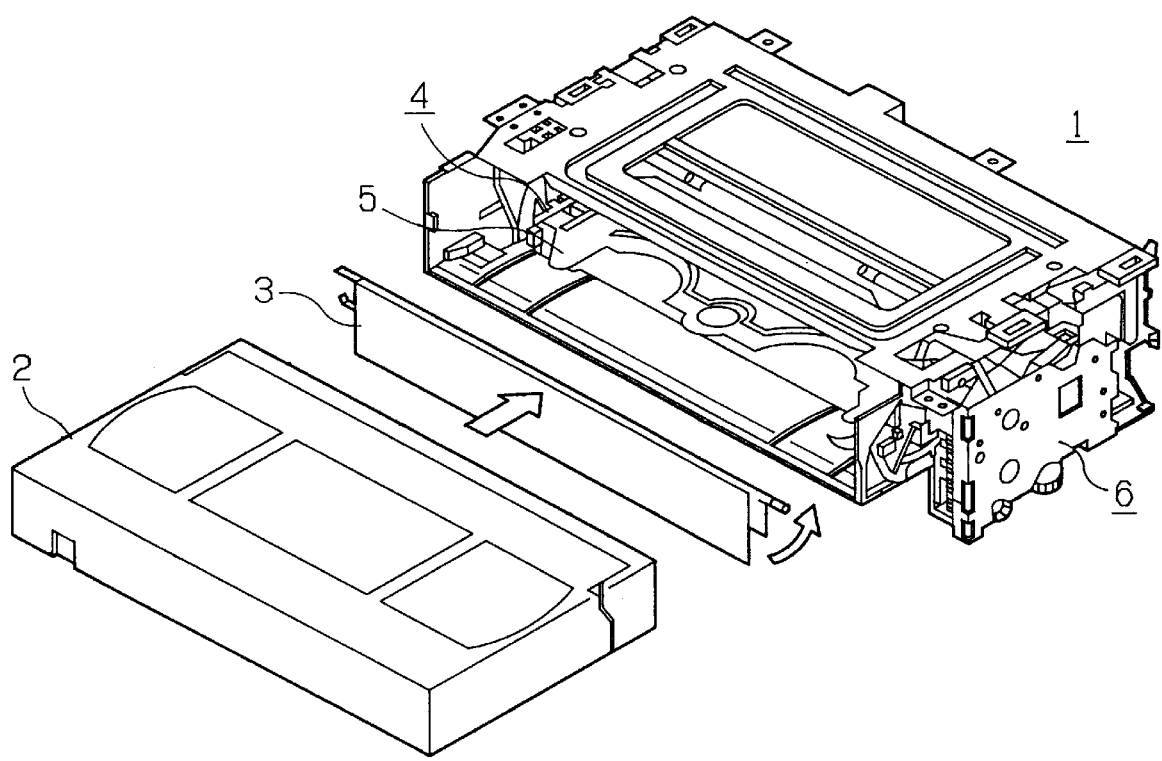
FIG. 1 is a perspective view of a conventional cassette loading device.
Figure 2:
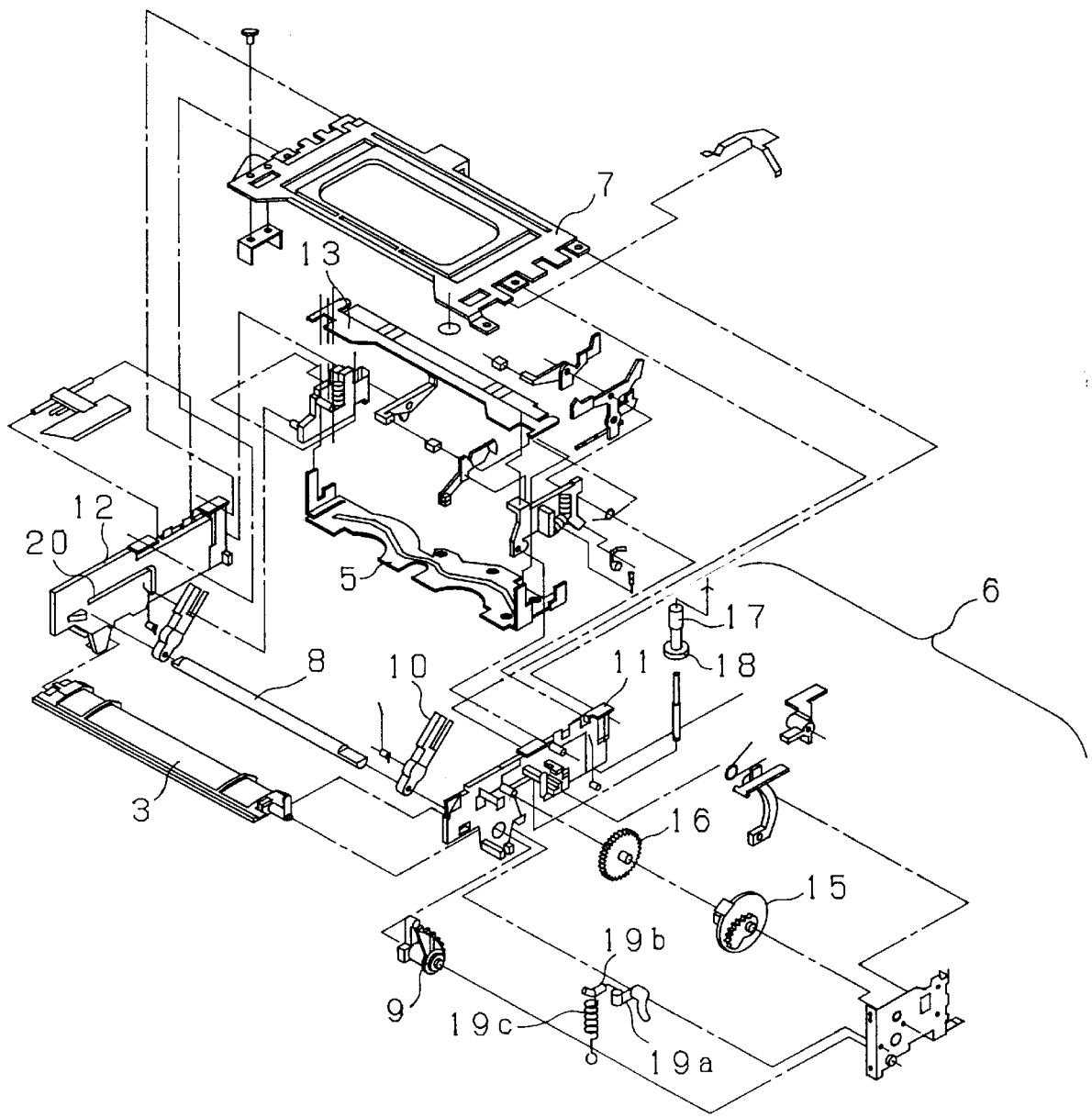
FIG. 2 is an exploded perspective view of the conventional cassette loading device.
Figure 3:
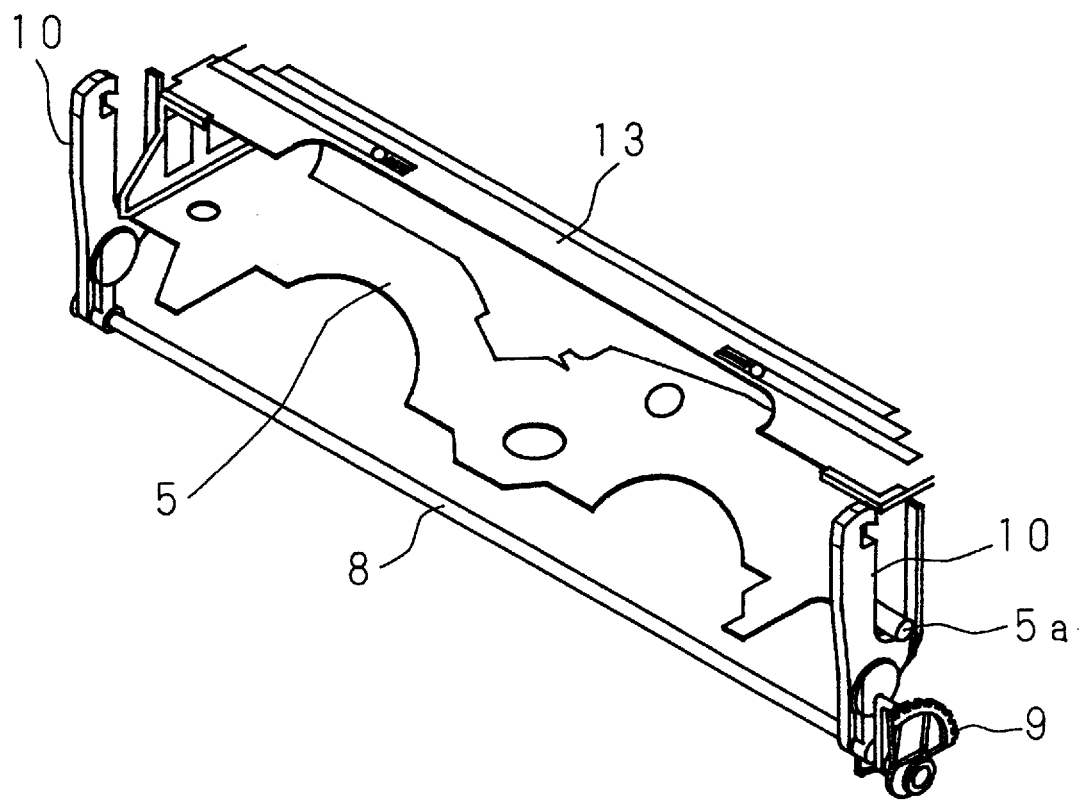
FIG. 3 is a perspective view of a movable part of the conventional cassette loading device.
Figure 4:
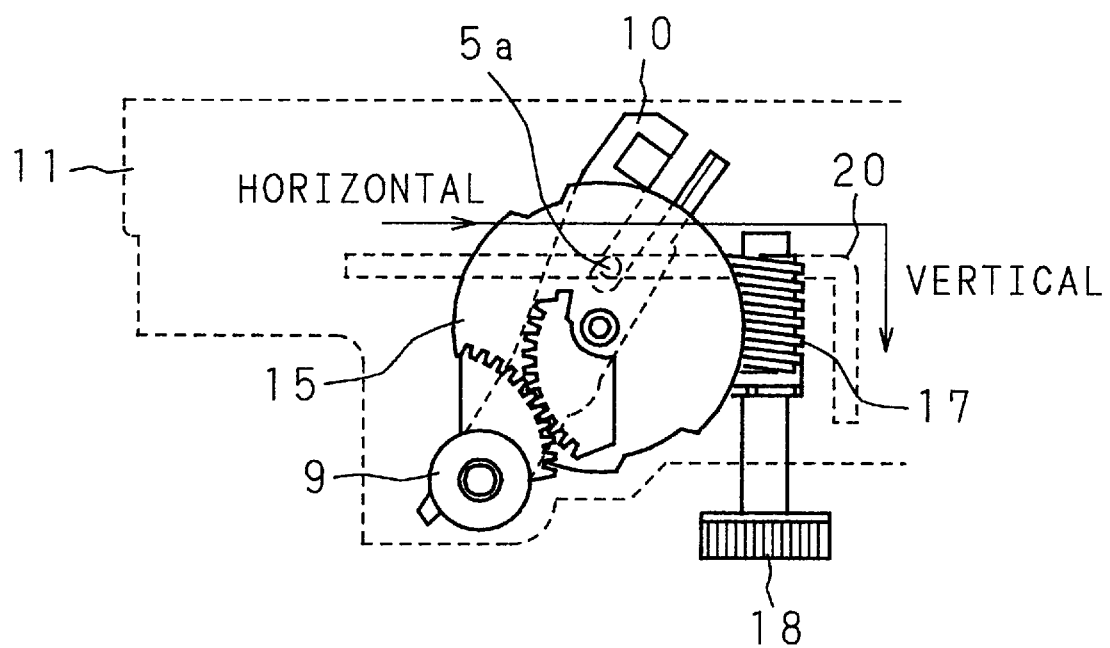
FIG. 4 is a side view showing a major portion of a conventional cassette housing drive.
Figure 5:
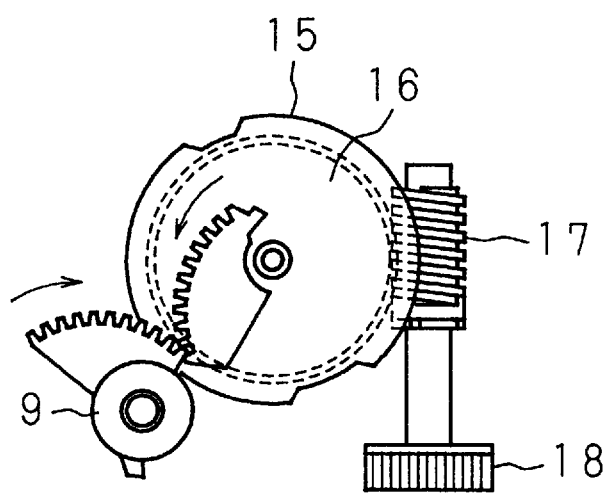
FIG. 5 is a side view showing a major portion of gears in FIG. 4.
Figure 6A:
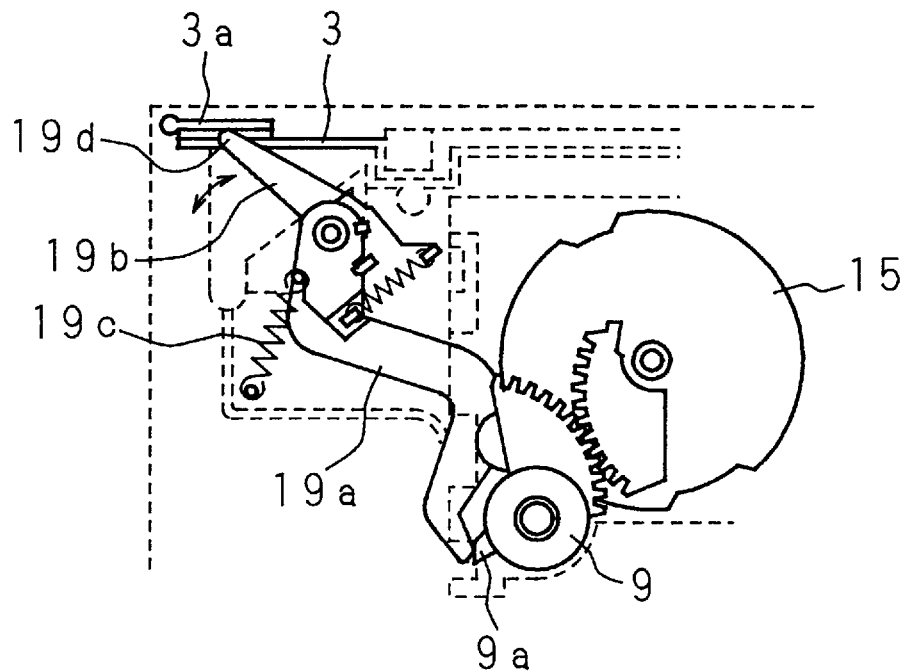
FIG. 6A is a side view showing a major portion of a conventional door moving mechanism in the door open state.
Figure 6B:
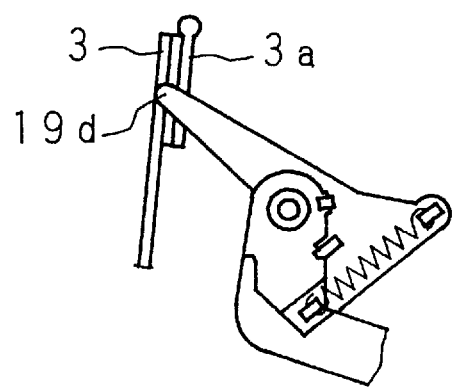
FIG. 6B is a side view showing a major portion of a conventional door moving mechanism in the door close state.
Figure 7:
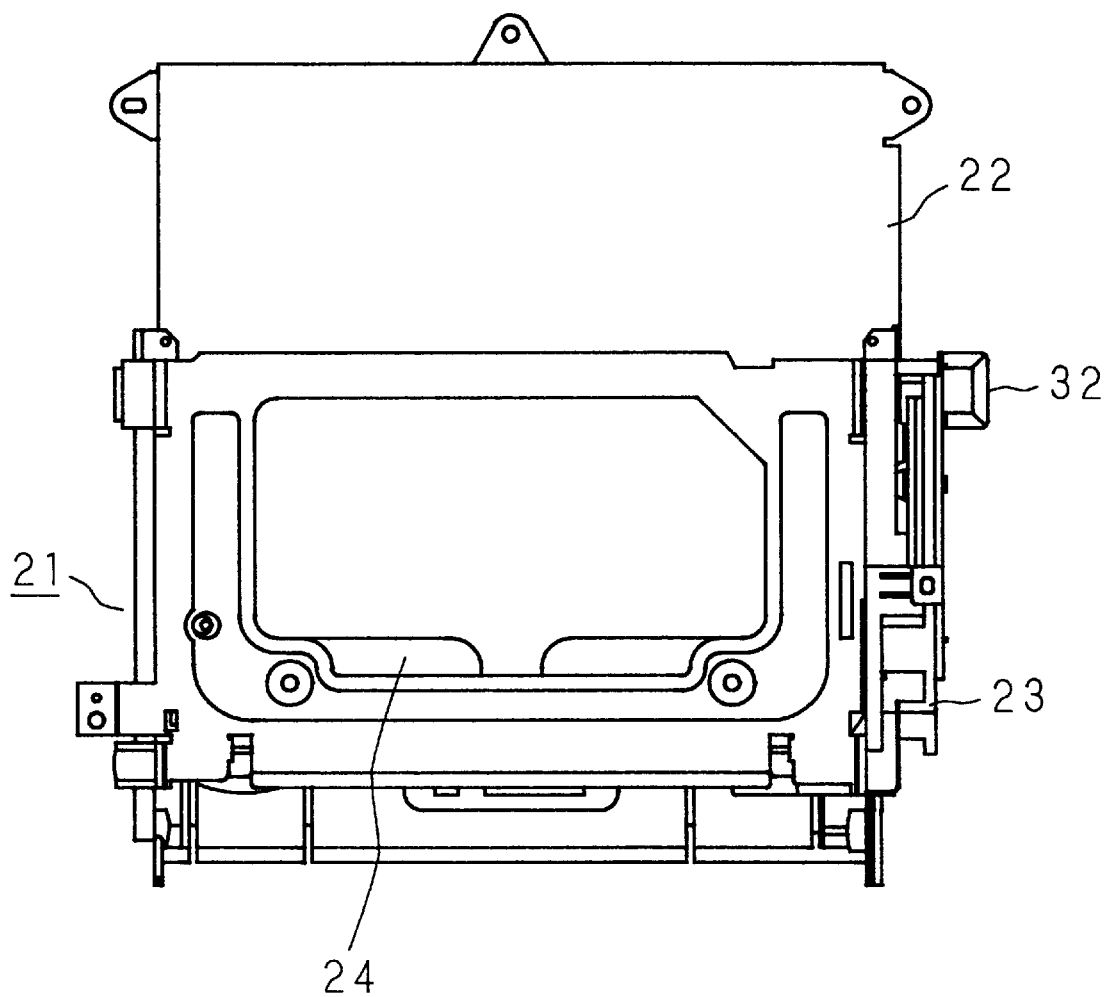
FIG. 7 is a plan of a cassette loading device of an embodiment of the invention.
Figure 8:
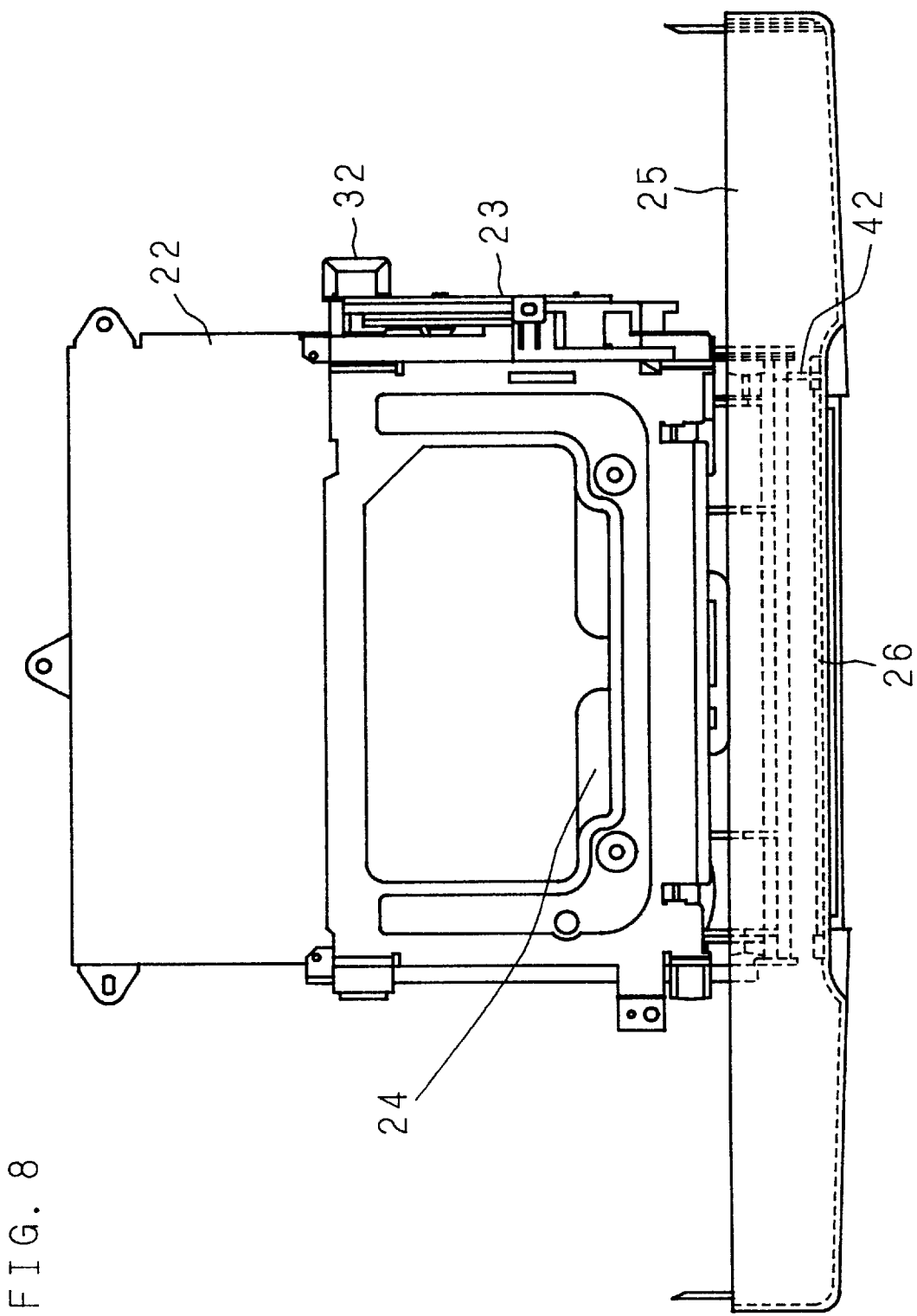
FIG. 8 is a plan of the cassette loading device in FIG. 7 together with a front panel attached thereto.
Figure 9:
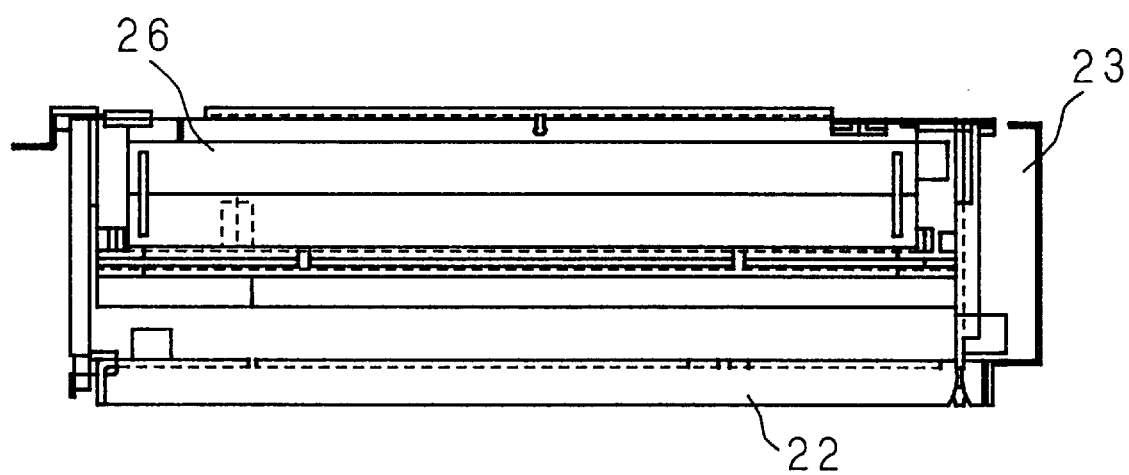
FIG. 9 is an elevation of the cassette loading device in FIG. 7.
Figure 10:
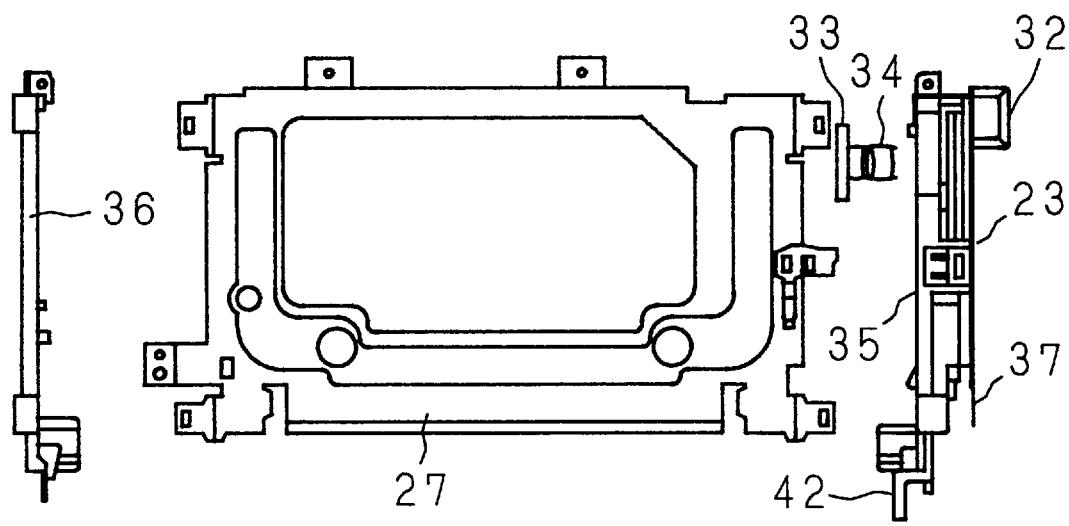
FIG. 10 is an exploded view of the cassette loading device in FIG. 7.
Figure 11:
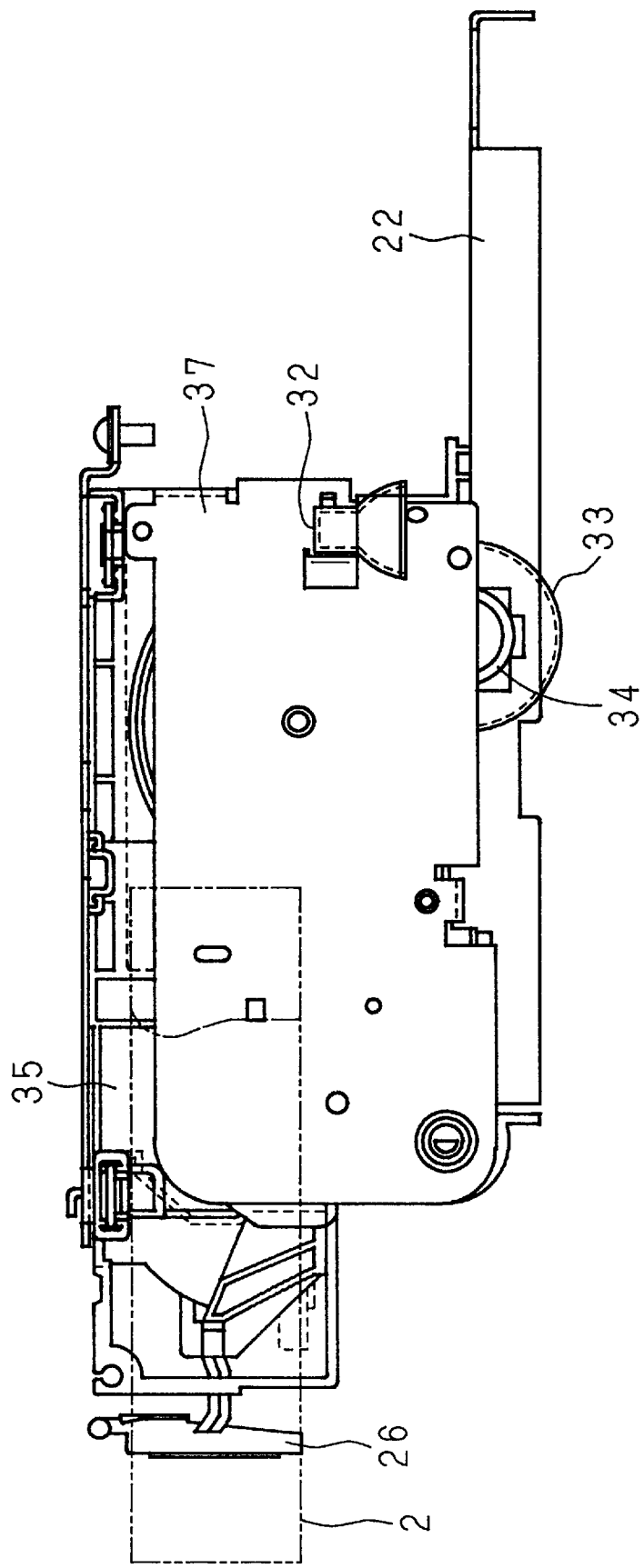
FIG. 11 is a side view of the cassette loading device in FIG. 7.

FIG. 7 is an elevation of a cassette loading device, FIG. 8 is a plan showing the cassette loading device in FIG. 7 together with a front panel attached thereto, FIG. 9 is an elevation of the structure in FIG. 7, FIG. 10 is an exploded view of the structure in FIG. 7, and FIG. 11 is a side view of the structure in FIG. 7.

In FIG. 7, "21" indicates a cassette loading device assembled on a main plate 22, and "23" indicates the drive force transmitting mechanism which is formed of spur gears and transmits the drive force of an unillustrated loading motor for performing operations such as loading and ejection of a cassette. A reference number "24" indicates a cassette housing which houses the cassette and is movable among positions such as a loading position and an ejection position. A reference number "32" indicates a photosensor housing of a photosensor which receives a light beam from an unillustrated light source for detecting a trailing end of tape. In FIG. 8, "25" indicates a front panel, "26" indicates a door, "42" indicates a door moving arm for opening and closing the door 26. In FIG. 10, "27" indicates a top plate, "28" indicates a bottom plate on which the cassette 2 is placed, and "29" indicates a synchronization gear carried on a shaft 31. A reference number "33" indicates a gear driven by the unillustrated loading motor. A reference number "34" indicates a drive gear which is coaxial to the gear 33 and applies the drive force to a gear of the drive force transmitting mechanism 23. A reference number "35" indicates a right side plate, "36" indicates a left side plate, and "37" indicates a cover for preventing dislocation of the gear 33 disposed in the drive force transmitting mechanism 23. A reference number "44" indicates a boss provided at each side of the bottom plate 28 and is moved for moving the cassette 2.

Figure 12:
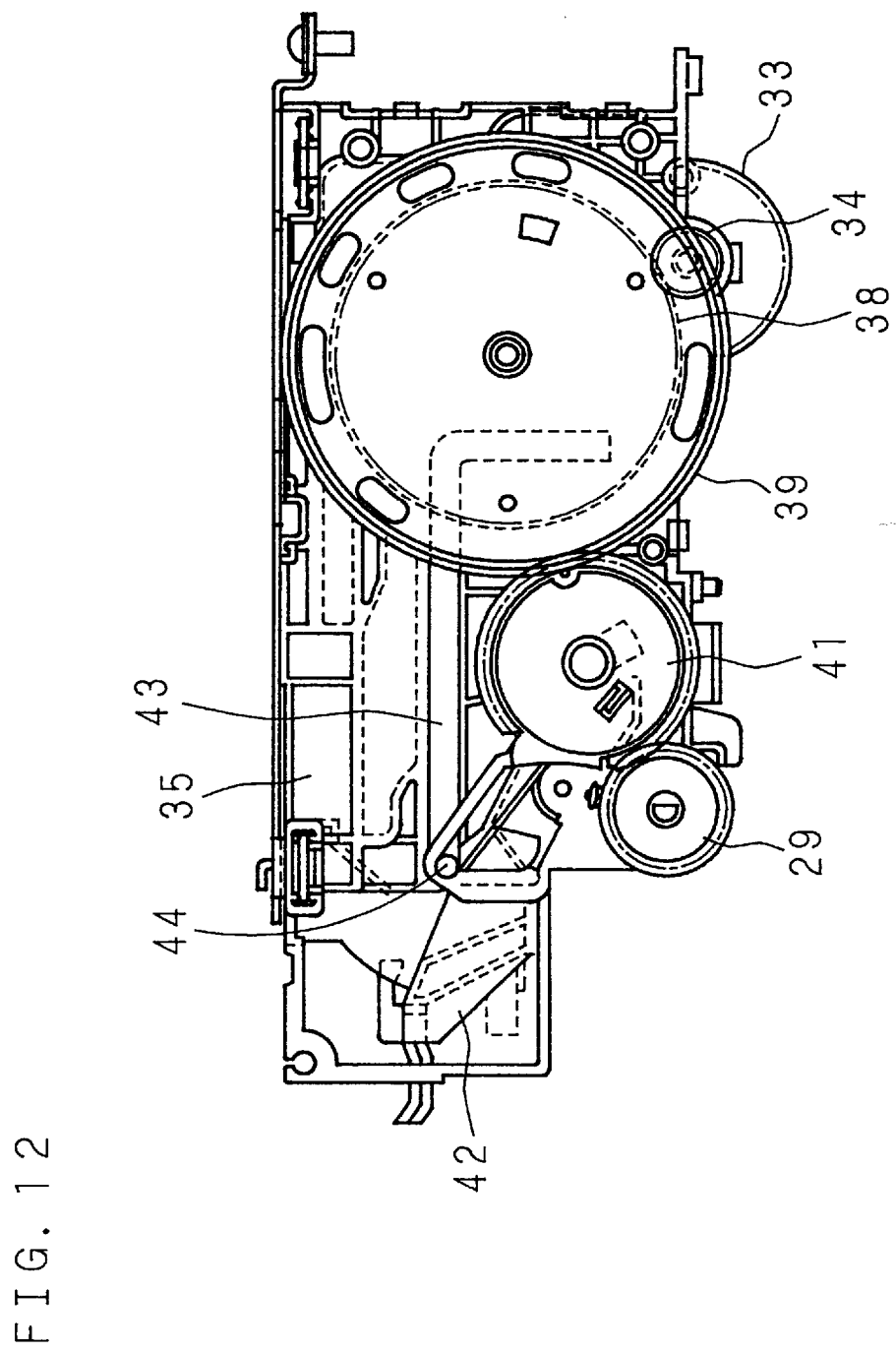
FIG. 12 is a side view of the drive force transmitting mechanism of an embodiment of the invention.
Figure 13:
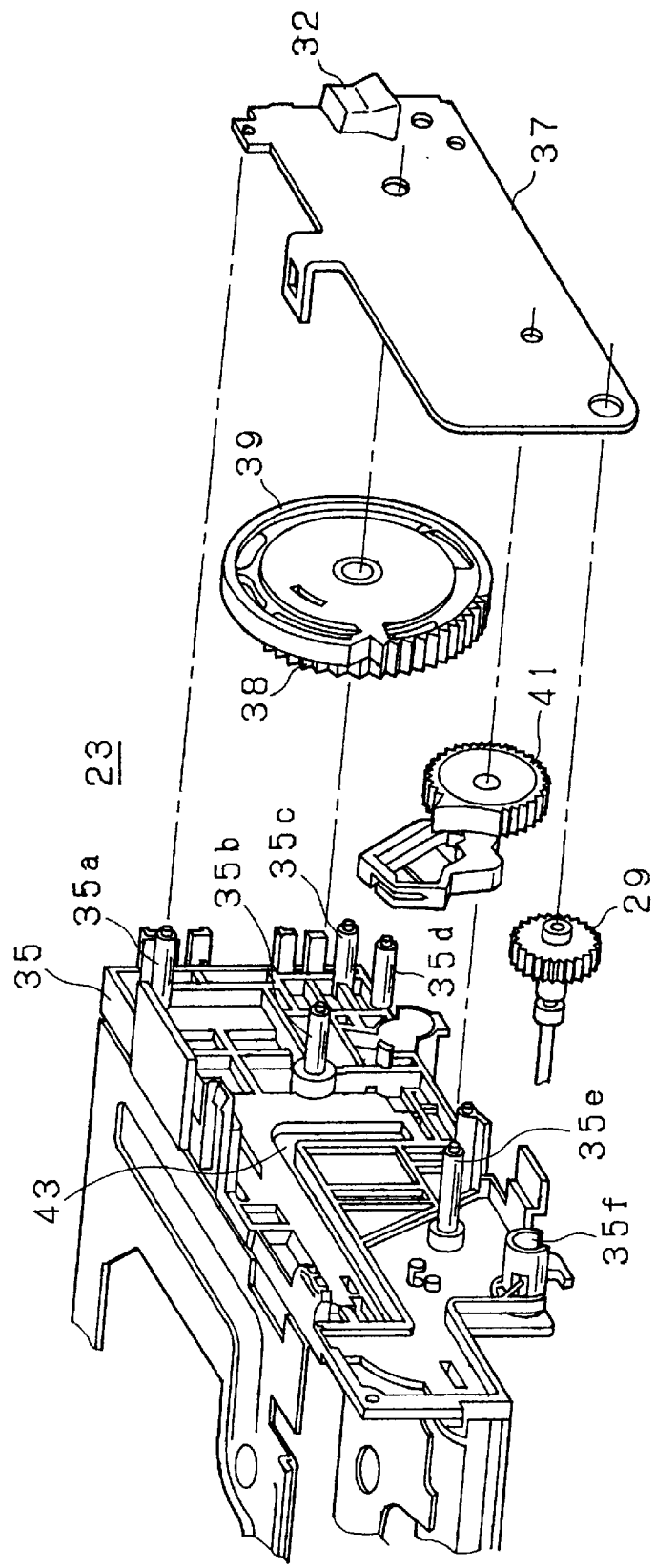
FIG. 13 is an exploded perspective view of the cassette loading device in FIG. 12.
Figure 14:
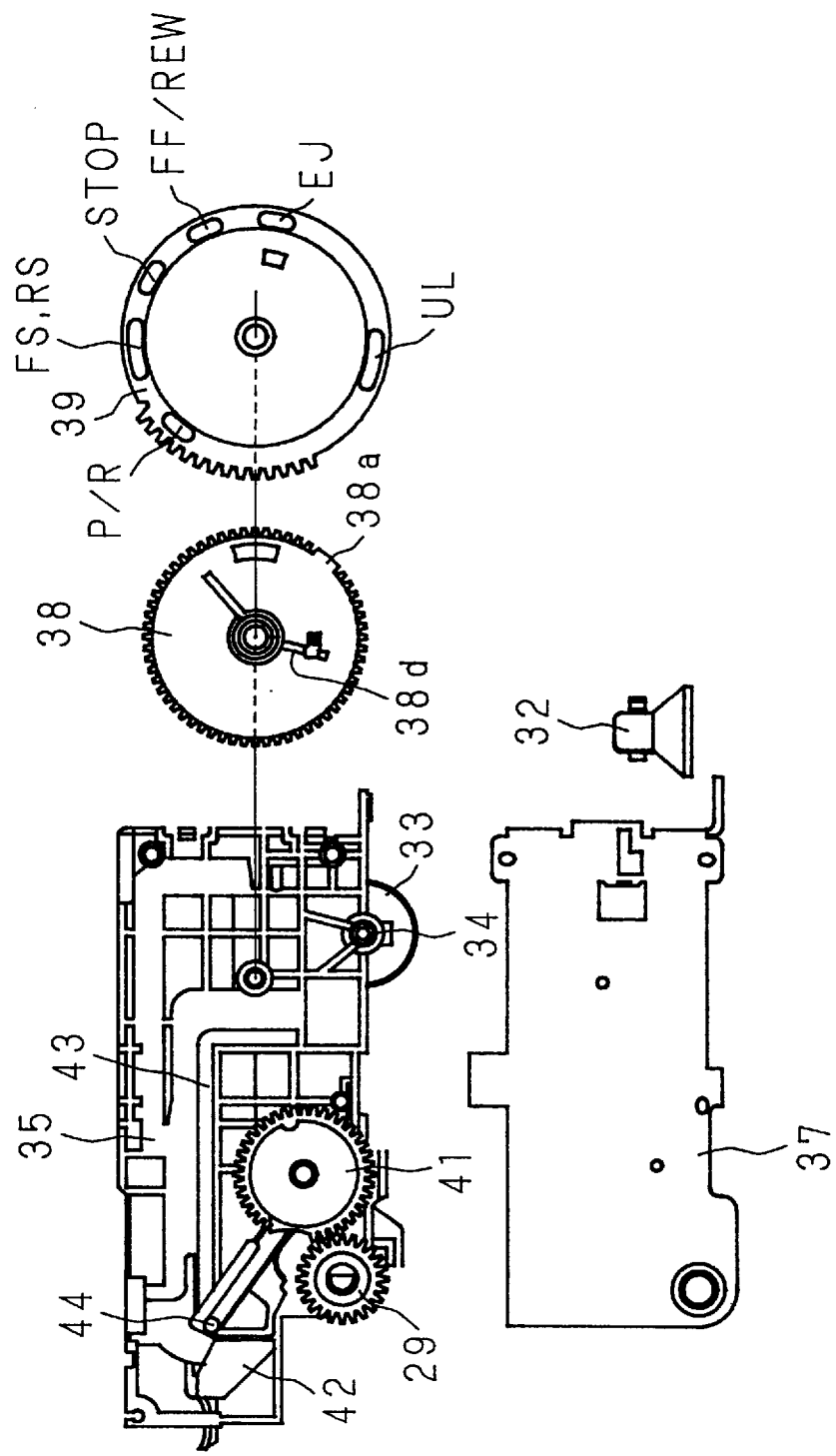
FIG. 14 is an exploded side view of the cassette loading device in FIG. 12.

FIG. 12 is a side view of the drive force transmitting mechanism. FIG. 13 is an exploded perspective view of the structure in FIG. 12, and FIG. 14 is an exploded side view of the structure in FIG. 12. In FIGS. 12, 13 and 14, 35a, 35b, 35c, 35d, 35e and 35f indicate bosses protruded from the right side plate 35, which are inserted into or fitted around the gear 38, gear sense 39, arm lock 41 and synchronization gear 29, and are also fitted to corresponding apertures in a cover 37 for fixing the cover 37. A reference number "38" indicates a gear driven by the drive gear 34, and is adapted to rotate within a range smaller than 360 degrees in accordance with moving patterns such as play/record and forwarding/rewinding. A reference number "39" indicates a gear sense which is arranged rotatably and coaxially to the gear 38, and is rotated by the gear 38 via a spring 38d in FIG. 14. The gear sense 39 rotates within a range smaller than 360 degrees.

A reference number "41" indicates an arm lock (i.e., arm for loading the cassette) which is provided with a gear and an arm, and is driven by the gear sense 39 to move the boss 44 along a guide groove 43 provided at the right side plate 35 for loading or ejecting the cassette 2. Also, it drives the synchronization gear 29 to move the unillustrated boss along a guide groove provided at the left side plate 36. A reference number "42" indicates a door moving arm for opening and closing the same.

In the steps for assembling the drive force transmitting mechanism thus constructed, as shown in FIG. 13, the bosses 35a, 35b, 35c, 35d, 35e and 35f are provided at the right side plate 35, and are fitted into or around the gear 38, gear sense 39, arm lock 41 and synchronization gear 29 as well as the cover 37 for preventing axial dislocation thereof. Only by these steps, the assembly of the drive force transmitting mechanism 23 is completed. As described above, only by the steps in which the drive members such as gears and arms, i.e., various drive force transmitting members are fitted to the bosses and the cover is attached thereto, the assembly of the drive force transmitting mechanism is completed, so that the assembly can be performed readily within a short time, resulting in improvement of workability.

Meanwhile, in FIG. 14, the gear 38 is driven by the drive gear 34 to rotate through an angle less than 360 degrees in accordance with the moving patterns such as play/record and forwarding/rewinding. However, the gear 38 may rotate beyond an intended rotational range when a control circuit is adjusted or a trouble occurs in the control circuit. In this case, if the gear 38 were formed of an ordinary gear provided at its entire periphery with teeth, the drive gear 34 would drive the gear 38 to make many rotations, so that the phases of the gears 38 and 34, which had been adjusted, would shift from correct phases corresponding to the moving patterns.

In view of the above, a stopper 38a is arranged between the teeth corresponding to the rear end of the rotational range of the gear 38, so that the stopper 38a may prevent the gear 38 from rotation beyond the intended rotational range and may also prevent idling of the drive gear 34.

Figure 15A:
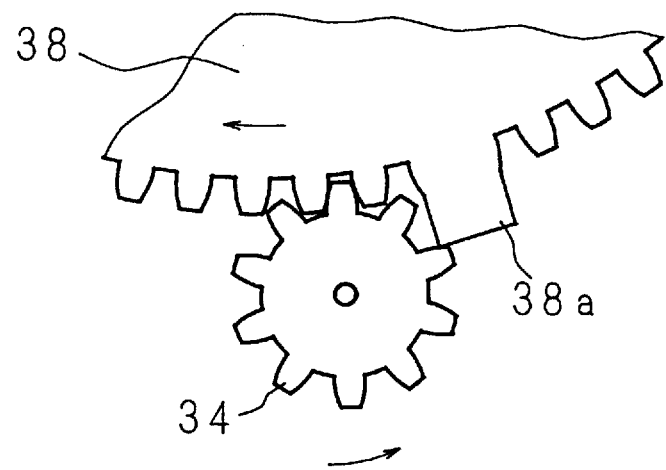
FIG. 15A shows a structure and an operation of a gear stopper of an embodiment of the invention.
Figure 15B:
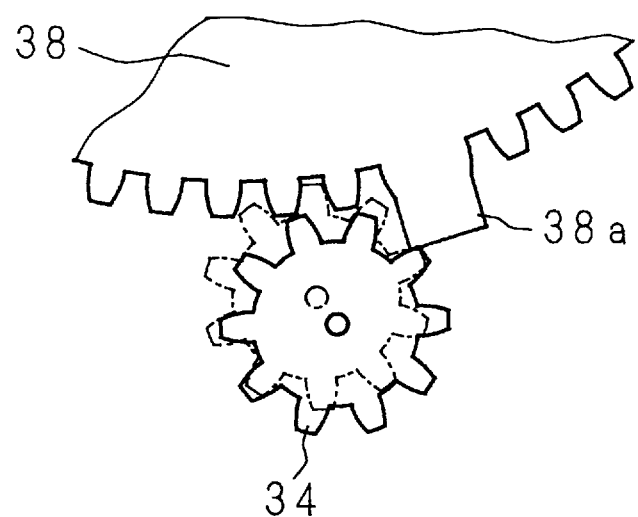
FIG. 15B shows a structure and an operation of a gear stopper of an embodiment of the invention.

FIGS. 15A and 15B show the stopper 38 of the embodiment. The stopper 38a has a top that is surface and has an appropriate height which allows a tooth surface of the drive gear 34 to push the top. The stopper 38a in FIG. 15A is in the state where the tooth of the drive gear 34 is in contact with the stopper 38a, and the tooth surface of the drive gear 34 pushes the top of the stopper 38a to stop the rotation. FIG. 15B shows a state where the shaft is bent or dislocated. In this case, the central axis is shifted correspondingly to erroneous disengagement of the teeth, and the tooth tends to pass over the stopper 38a. However, the tooth surface of the drive gear 34 pushes the top of the stopper 38a to stop the rotation. As described above, owing to provision of the stopper 38a having the height which allows the tooth surface of the drive gear 34 to push the top of the stopper 38a, the pushing force is applied in the radial direction to the gear 38 and is hardly applied thereto in the circumferential direction to produce rotation force, so that the drive gear 34 surely stops. By preventing the idling of the drive gear 34, it is possible to prevent the rotation of the gear 38 beyond the intended rotation range.

Figure 16A:
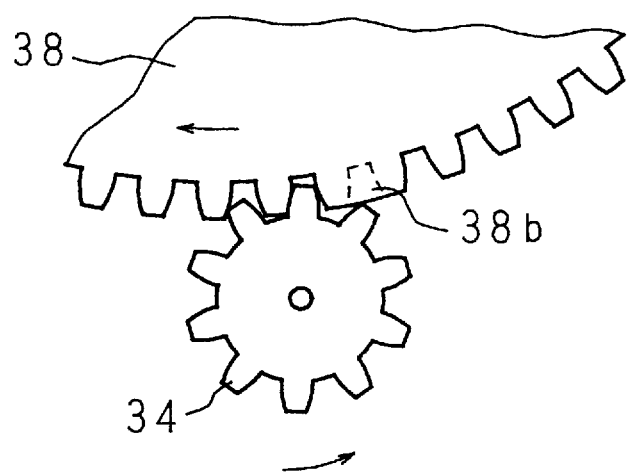
FIG. 16A shows a structure and an operation of the structure in FIGS. 15A and 15B before improvement.
Figure 16B:
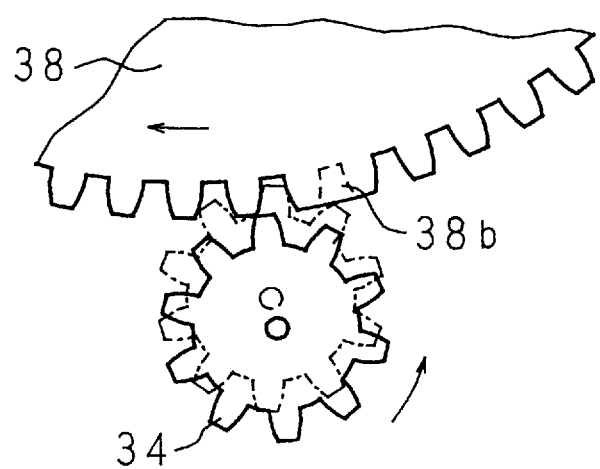
FIG. 16B shows a structure and an operation of the structure in FIGS. 15A and 15B before improvement.

FIGS. 16A and 16B show the stopper which is not improved. As shown in FIG. 16A, a stopper 38b is formed by filling a space between the teeth of the gear 38. According to this structure, the drive gear 34 having a shifted central axis may idle as shown in FIG. 16B, resulting in shift of the phases of the gears. The tooth which passes over the stopper 38b will engage the subsequent teeth without preventing the rotation.

Figure 17A:
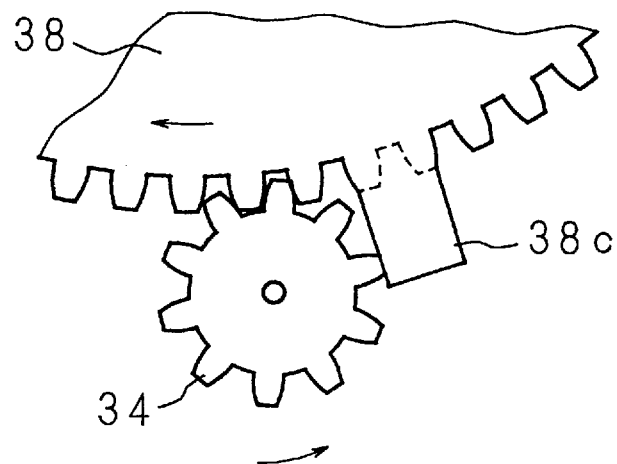
FIG. 17A shows a structure and an operation of the structure in FIGS. 15A and 15B before improvement.
Figure 17B:
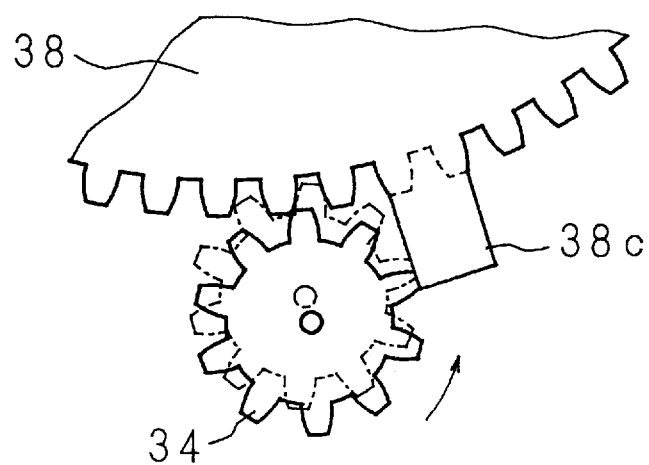
FIG. 17B shows a structure and an operation of the structure in FIGS. 15A and 15B before improvement.

Meanwhile, according to another unimproved stopper shown in FIGS. 17A and 17B, the stopper 38c has an excessively high top, so that the teeth of the drive gear 34 do not pass over the stopper 38c as shown in FIG. 17B, and thus the gear 38 is surely stopped. However, the drive gear 34 may idle without engaging the tooth tops of the gear 38, resulting in a shift of the phases. Accordingly, the stopper 38a in FIGS. 15A and 15B has the optimum structure for preventing the rotation.

Figure 18:
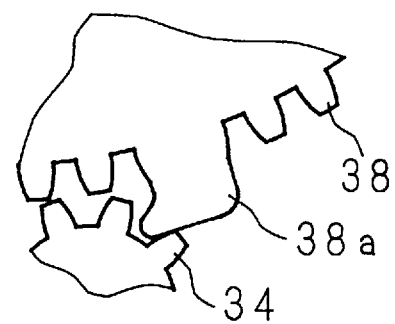
FIG. 18 shows a structure and an operation of a gear stopper of another embodiment of the invention.

FIG. 18 shows the stopper of another embodiment, in which the stopper 38a has a surface substantially parallel to the peripheral surface of the gear 38, and has an edge portion which protrudes forwardly in the rotating direction for increasing an area of the surface to be pushed by the drive gear 34. This ensures the stop of rotation of the gear 38. Also in this embodiment, the height of the stopper 38a is determined such that the tooth surface of the drive gear 34 pushes the stopper 38a in the radial direction.

Figure 19:
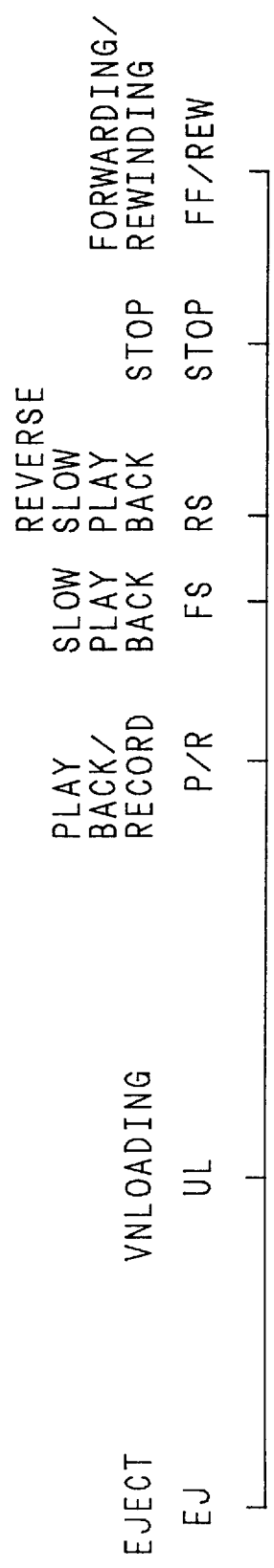
FIG. 19 is a development showing the position of apertures in a gear sense of an embodiment of the invention.

In FIG. 14, apertures formed at the gear sense 39 have configurations corresponding to various moving patterns such as EJ, UL, P/R, RS, FS, STOP and FF/REW. FIG. 19 is a development showing the moving patterns. Light beams emitted from the unillustrated light source pass through these apertures and are received by the photosensor disposed in the photosensor housing 32 (see FIG. 7). Since, a trailing end of the tape can be detected in accordance with various moving patterns of the tape cassette.

Figure 20:
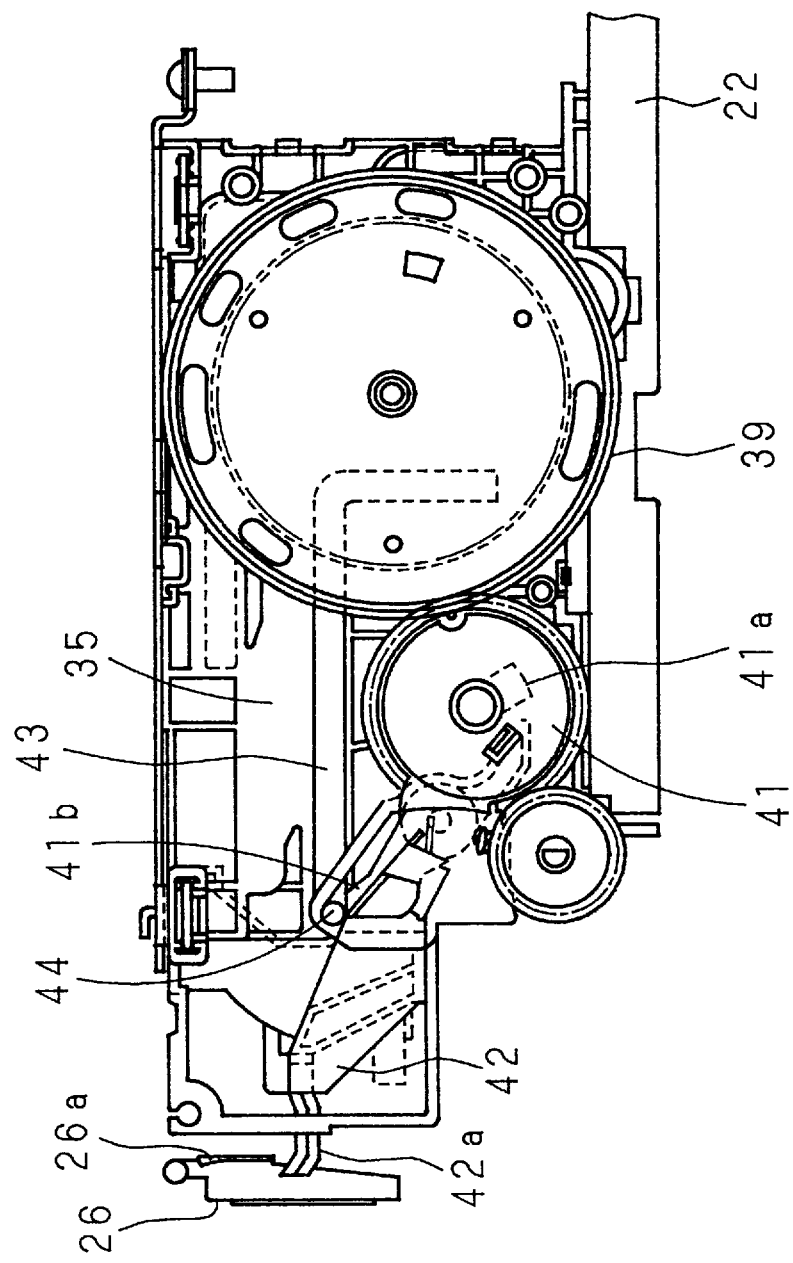
FIG. 20 is a side view showing a structure of a door moving mechanism of an embodiment of the invention.
Figure 21:
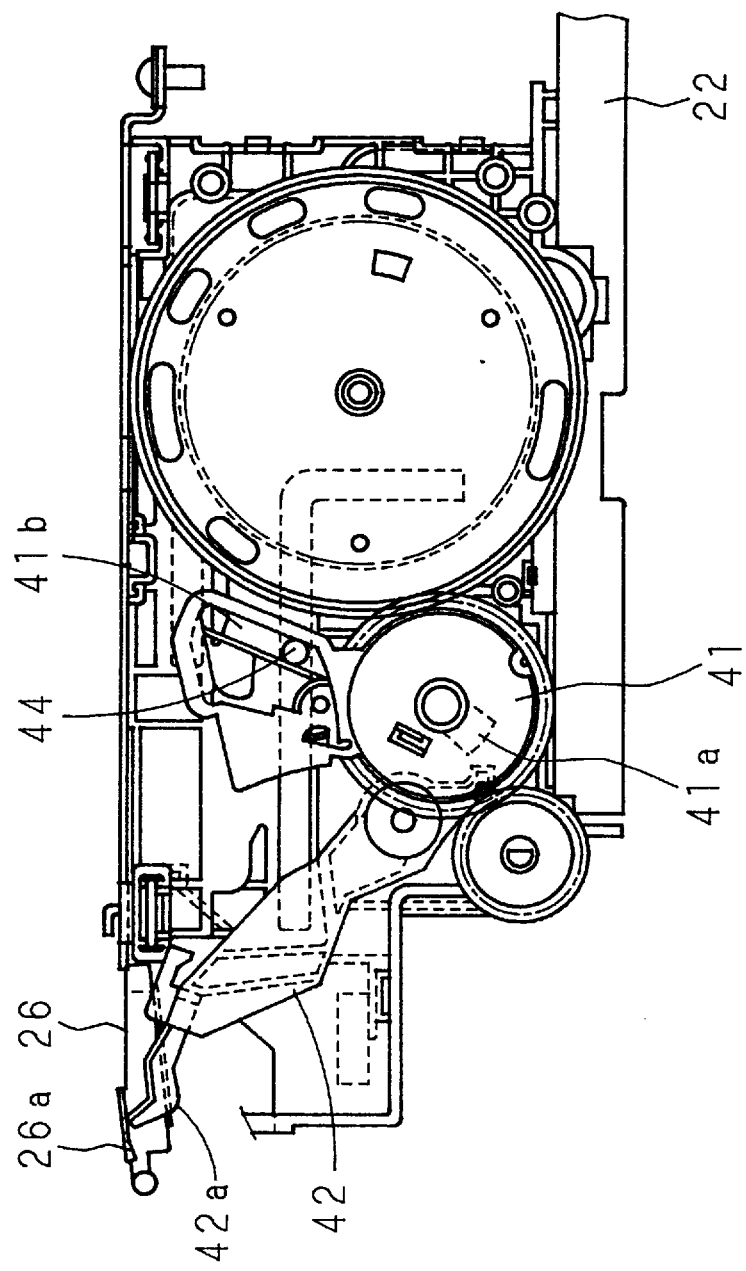
FIG. 21 is a side view showing a structure of the door moving mechanism of an embodiment of the invention.

FIGS. 20 and 21 are side views showing the structure of the door moving mechanism. FIG. 20 shows a state where the door 26 is closed and the cassette is not loaded. FIG. 21 shows a state where the door 26 is open and the cassette is being loaded or ejected. In FIG. 20, the arm lock 41 has a cam 41a, and the lower end of the door moving arm 42 is not engaged with the cam 41a, so that the door moving arm 42 is lowered by its own weight to locate its end 42a at the lower position. In this state, the boss 44 is located above the door moving arm 42 to prevent upward motion of the door moving arm 42.

Then, the operation of loading the cassette will be described below. As shown in FIG. 21, the cassette which is being inserted pushes the door 26 upward, and simultaneously, the unillustrated loading motor is driven to turn the arm lock 41 clockwise to engage the cam 41a with the door moving arm 42. The end 42a rises to move an arm engagement 26a, which is provided at an end of the door 26, upward, so that the door is held at the open position. When the arm lock 41 further turns clockwise to the loading position of the cassette, the raised cam 41a disengages from the door moving arm 42, so that the end 42a of the door moving arm 42 lowers and the door 26 is closed.

Then, the operation of ejecting the cassette is performed oppositely to the above loading operation. In other words, it is performed to attain the state shown in FIG. 20 through the state shown in FIG. 21. According to the door moving mechanism thus constructed, the door moving arm requires only one part for its function and does not require a part such as a spring. Also it is not necessary to provide a part for connection between the door and the door moving arm in contrast to the prior art. Further, when the cassette is ejected, the boss 44, of which the primary purpose is to move the cassette, is utilized to prevent the upward motion of the door moving arm 42, so that the end 42a does not rise. Thereby, it is possible to prevent contact of the end 42a in the raised or floated position with the door engagement portion 26a when attaching the front panel.

Figure 22A:
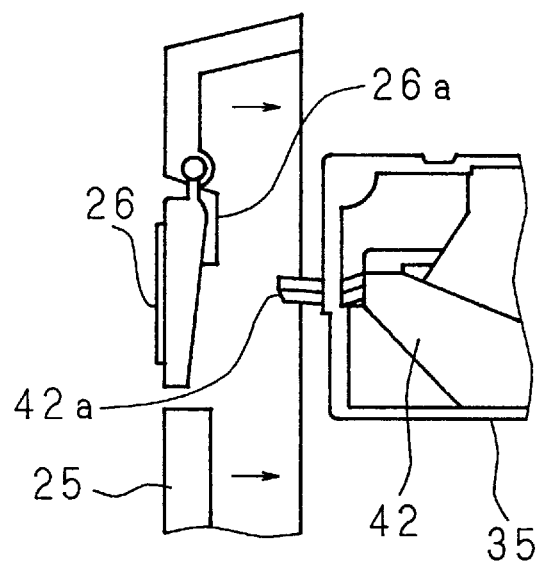
FIG. 22A shows a relationship in assembly between the door moving mechanism and a front panel of an embodiment of the invention.
Figure 22B:
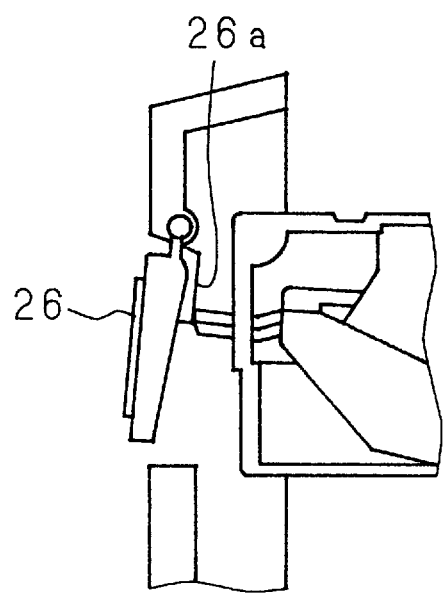
FIG. 22B shows a relationship in assembly between the door moving mechanism and the front panel of an embodiment of the invention.

FIG. 22 shows the relationship between the door moving mechanism and the front panel during assembly. FIG. 22A shows a state where the front panel 25 is being assembled, and particularly, the front panel 25 is being pushed in the direction indicated by arrow toward the assembly position shown in FIG. 20. In this step, if the end 42a were raised and maintained at the floating position, the end 42a of the door moving arm 42 would contact with the door engagement portion 26a as shown in FIG. 22B. In the illustrated embodiment, however, the boss 44 is utilized to prevent the rise of the door moving arm 42 as shown in FIG. 20, so that the assembly is not impeded.

In the embodiment described above, the boss 44 is used for preventing the upward motion of the door moving arm 42. However, the arm lock 41 may be used instead of the boss 44 for directly preventing the upward motion of the door moving arm 42. Thus, the arm for the loading may be used to prevent the upward motion of the door moving arm.

According to the invention, as described hereinbefore, the structure can be assembled through such simple steps that the spur gears for transmitting the drive force are fitted to the bosses protruded from the side plate, and the cover for preventing dislocation of the spur gears are fixed. Therefore, the assembly time can be reduced.

Further, the stopper for preventing rotation of the spur gear is operable to prevent the spur gears for transmitting the drive force from rotating beyond a predetermined rotational range. Further, for this purpose, the stopper has such a height that the tooth surface of the drive gear pushes the top of the stopper. Therefore, the drive gear is prevented from idling and passing over the stopper, and thus rotation of both the gears can be stopped reliably.

Since the apertures of the gear sense through which the light beams pass are formed only at the positions required in accordance with the moving patterns, it is possible to detect a trailing end of the tape in accordance with various moving patterns of the tape cassette.

The door moving arm is formed of one member, and a part for connecting the same to the door is not required. Thus, the parts are reduced in number and the assembly is facilitated. Since a stopper device is provided for preventing the upward motion of the door moving arm when the loading arm is at the cassette ejection position, it is possible to prevent engagement of the front panel with the door moving arm during the assembly of the front panel.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A cassette loading device for loading and ejecting a tape cassette, comprising:

a cassette housing for housing and moving said tape cassette between an ejected position and a loaded position;

drive force transmitting means for transmitting a drive force to said cassette housing;

moving means for moving said cassette housing using said drive force transmitted from said drive force transmitting means;

a door opening/closing arm, made of one single element including a first portion at a first end for engaging said moving means within a predetermined rotational range, and a second portion at a second end for contacting and pushing a door provided at a loading inlet for said tape cassette upward to open the door in an intended direction in accordance with the moving range of said moving means; and engaging means protruding from said cassette housing for selectively engaging and locking said door opening/closing arm whereby said door opening/closing arm is prevented from opening the door when said cassette housing is in the ejected position.

2. The cassette loading device according to claim 1, wherein said door opening/closing arm engages with said moving means to open said door when said cassette housing is between said ejected position and said loaded position.

3. The cassette loading device according to claim 2, wherein said door opening/closing arm disengages with said moving means to close said door when said cassette housing is in said loaded position.

4. The cassette loading device of claim 1, wherein said engaging means is a pin protruding from said cassette housing.

5. A cassette loading device of claim 1, wherein said moving means includes a cam engaging with said door opening/closing arm to open said door when said moving means is within said predetermined rotational range.

6. A cassette loading device for loading and ejecting a tape cassette, comprising:

a cassette housing for housing and moving said tape cassette between an ejected position and a loaded position;

drive force transmitting means for transmitting a drive force to said cassette housing;

moving means for moving said cassette housing using said drive force transmitted from said drive force transmitting means;

a door opening/closing arm, made of one single element and including a first portion at a first end for engaging said moving means within a predetermined rotational range, and a second portion at a second end for contacting and opening a door provided at a loading inlet for said tape cassette in an intended direction in accordance with the moving range of said moving means; and engaging means protruding from said cassette housing for selectively engaging and locking said door opening/closing arm, whereby said door opening/closing arm is prevented from opening the door when said cassette housing is in said ejected position, wherein said moving means pushes said second portion at a second end of the door opening/closing arm upward when said cassette housing is between said ejected position and said loaded position to thereby open the door.

7. The cassette loading device of claim 6, wherein said engaging means is a pin protruding from said cassette housing.

8. A cassette loading device for loading and ejecting a tape cassette, comprising:

a cassette receiving housing for moving said tape cassette between an ejected position and a loaded position;

a door opening/closing arm, made of one single element including a first portion at a first end and a second portion at a second end, selectively movable between a first position for opening a door provided at a loading inlet in an intended direction by engaging the second portion of the door opening/closing arm with said door, and a second position for disengaging the second portion of the door opening/closing arm from said door; and forcing means, formed on said cassette receiving housing, for preventing said door opening/closing arm from moving towards said first position when said cassette receiving housing is in said ejected position by engaging said door opening/closing arm and locking said arm at said second position when said cassette receiving housing is in said ejected position, whereby the door remains closed until said tape cassette is moved through said loading inlet.

9. A cassette loading device of claim 8, further comprising:

drive force transmitting means for transmitting force to said cassette receiving housing to move said cassette receiving housing between said ejected position and said loaded position.

10. A cassette loading device of claim 9, wherein said drive force transmitting means further transmits force to said first portion of the door opening/closing arm for moving said second portion of the door opening/closing arm between said first position and said second position.

11. A cassette loading device of claim 10, wherein said drive force transmitting means includes an engaging means for engaging with the first portion and moving the second portion of said door opening/closing arm to said first position only when said cassette receiving housing is in a predetermined region between said ejected position and said loaded position.

12. The cassette loading device of claim 11, wherein said engaging means is a cam formed on said drive force transmitting means.

13. A cassette loading device of claim 8, wherein said forcing means is a pin protruding from said cassette receiving housing.

14. A cassette loading device for loading and ejecting a tape cassette, comprising:

a cassette housing for housing and moving said tape cassette between an ejected position and a loaded position;

drive force transmitting means for transmitting a drive force to said cassette housing;

moving means for moving said cassette housing using said drive force transmitted from said drive force transmitting means;

door opening/closing means for opening a door provided at a loading inlet for said tape cassette in an intended direction by engaging with said moving means within a predetermined moving range of said moving means and pushing the door upward; and engaging means protruding from said cassette housing for selectively engaging and locking said door opening/closing means, to prevent said door opening/closing means from opening the door when said cassette housing is in said ejected position.

15. The cassette loading device according to claim 14, wherein said door opening/closing means engages with said moving means to open said door when said cassette housing is between said ejected position and said loaded position.

16. The cassette loading device according to claim 15, wherein said door opening/closing means disengages from said moving means to close said door when said cassette housing is in said loaded position.

17. The cassette loading device of claim 14, wherein said engaging means is a pin protruding from said cassette housing.

18. A cassette loading device for loading and ejecting a tape cassette, comprising:

a cassette receiving housing moving said tape cassette between an ejected position and a loaded position;

a door opening/closing means selectively movable between a first position for opening a door provided at a loading inlet in an intended direction by engaging with said door, and a second position for disengaging from said door; and forcing means, formed on said cassette receiving housing, for preventing said door opening/closing means from moving toward said first position when said cassette receiving housing is at said ejected position by engaging with said door opening/closing means and locking said door opening/closing means at said second position when said cassette receiving housing is in said ejected position, whereby the door remains closed until said tape cassette is moved through said loading inlet.

19. A cassette loading device of claim 18, wherein said forcing means is a pin protruding from said cassette receiving housing, said pin engages with said door opening/closing means to prevent said door from moving when said cassette receiving housing is in said ejected position.

20. The cassette loading device of claim 18, further comprising:

drive force transmitting means for transmitting force to said cassette receiving housing to move said cassette receiving housing between said ejected position and said loaded position, wherein said drive force transmitting means includes a cam, said cam being selectively engageable with said door opening/closing means to move said door opening/closing means to said first position when said cassette receiving housing is at a position other than at said ejected position.

21. A cassette loading device for loading and ejecting a tape cassette, comprising:

a cassette receiving housing which moves said tape cassette between an ejected position and a loaded position;

a door opening/closing arm selectively movable between a first position for opening a door provided at a loading inlet in an intended direction by engaging with said door, and a second position for disengaging from said door; and an inhibiting unit provided on said cassette receiving housing which prevents said door opening/closing arm from moving towards said first position by directly contacting said door opening/closing arm when said cassette receiving housing is in said ejected position, whereby the door remains closed until said tape cassette is moved through said loading inlet.

22. The cassette loading device of claim 21, wherein said inhibiting unit is a pin protruding from said cassette receiving housing.

* * * * *